United States Patent [19]
Clark

[11] Patent Number: 5,524,610
[45] Date of Patent: Jun. 11, 1996

[54] SOLAR POWERED/MULTIPLE FUEL COOKING DEVICE

[76] Inventor: John D. Clark, 19089 Summers Dr., South Bend, Ind. 46637

[21] Appl. No.: 408,261

[22] Filed: Mar. 20, 1995

[51] Int. Cl.⁶ .................................................. F24J 2/02
[52] U.S. Cl. .................. 126/682; 126/41 R; 126/25 R
[58] Field of Search ............................ 126/680–682, 126/41 R, 25 R

[56] References Cited

U.S. PATENT DOCUMENTS

| | | | |
|---|---|---|---|
| 4,446,854 | 5/1984 | Clevett et al. | 126/682 |
| 4,848,320 | 7/1989 | Burns et al. | 126/682 |
| 5,139,010 | 8/1992 | Borgens et al. | 126/682 |

*Primary Examiner*—Carroll B. Dority
*Attorney, Agent, or Firm*—Baker & Daniels

[57] ABSTRACT

A cooking device cooks food by using solar radiation, charcoal or similar solid burnable fuels, heating candles, gas, or electricity. The cooker includes a base and solar reflectors along opposite sides of the base. The reflectors pivot with respect to the base to focus solar radiation along an axis extending parallel to the reflectors. Food is supported along or adjacent the axis for cooking. A grate within the base supports charcoal or similar fuels and a gas burner and electric heating element are also supported by the base for use in cooking. A container can be mounted within the base for holding food to be cooked.

21 Claims, 6 Drawing Sheets

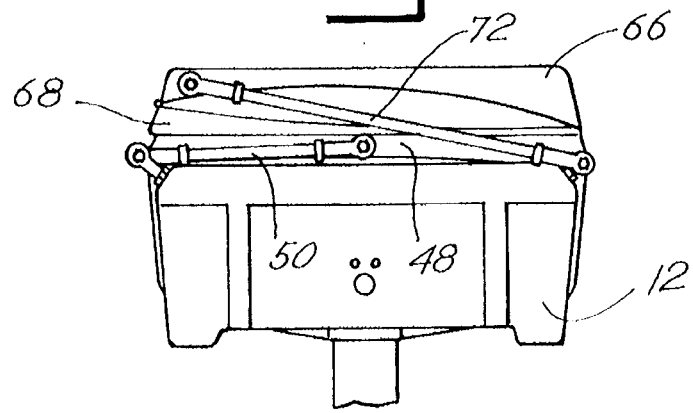
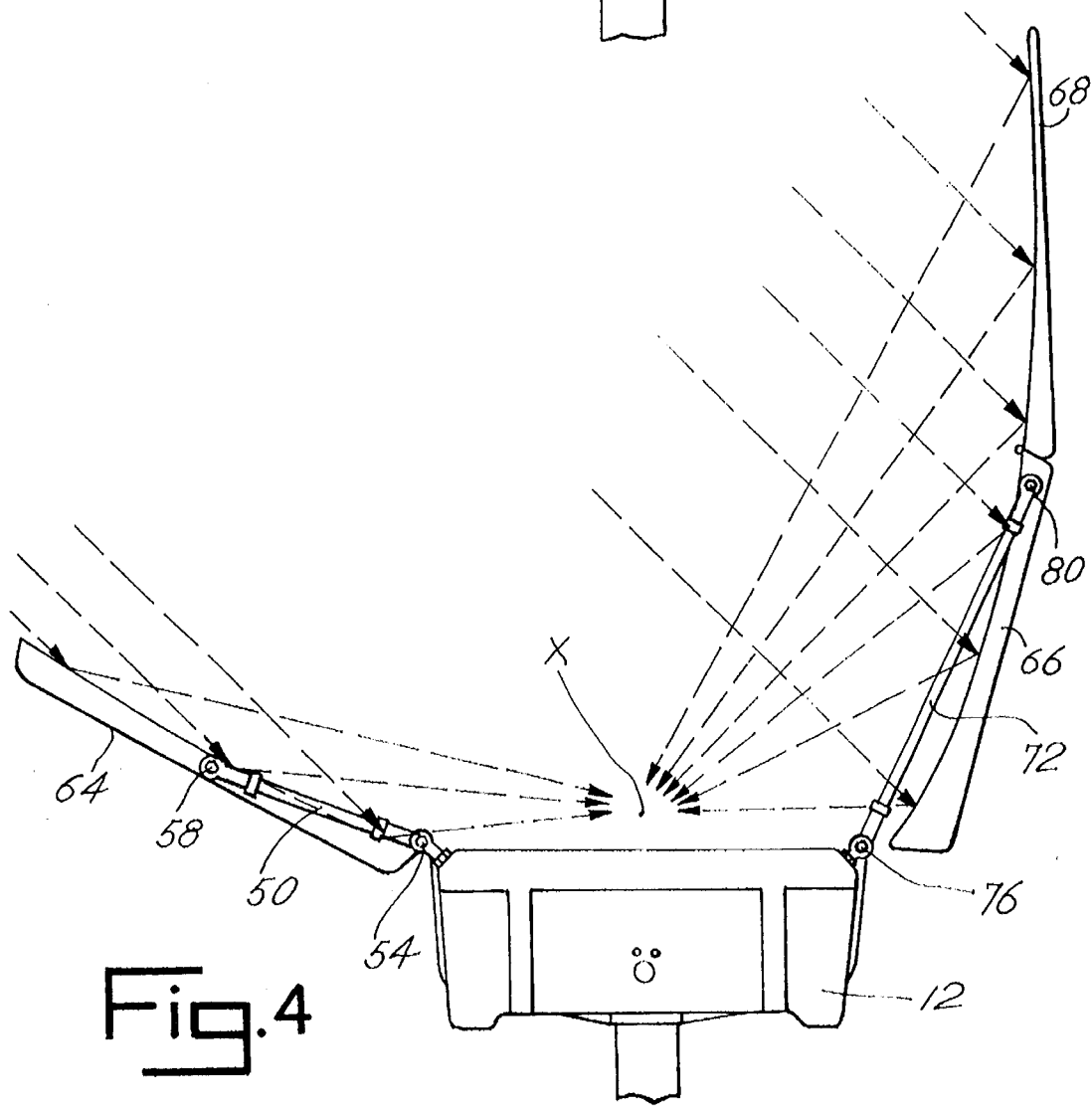

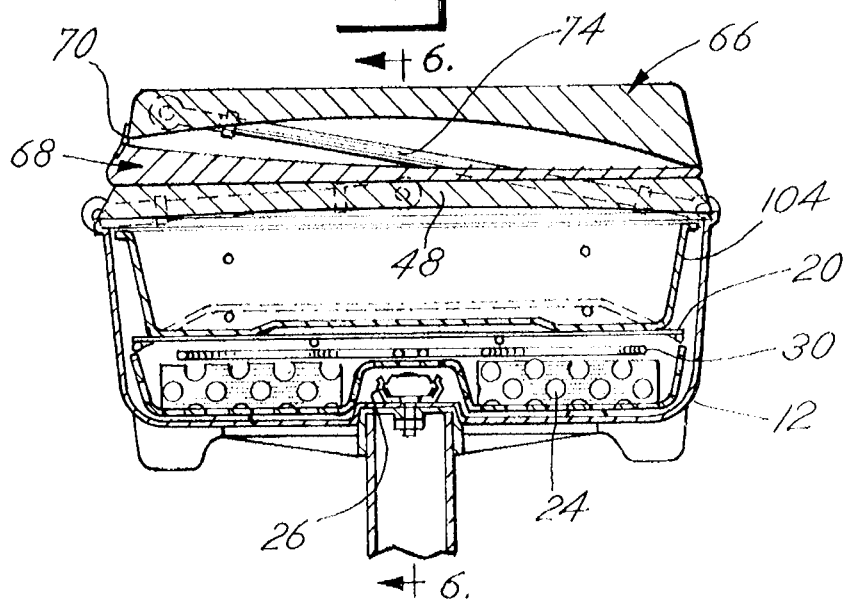
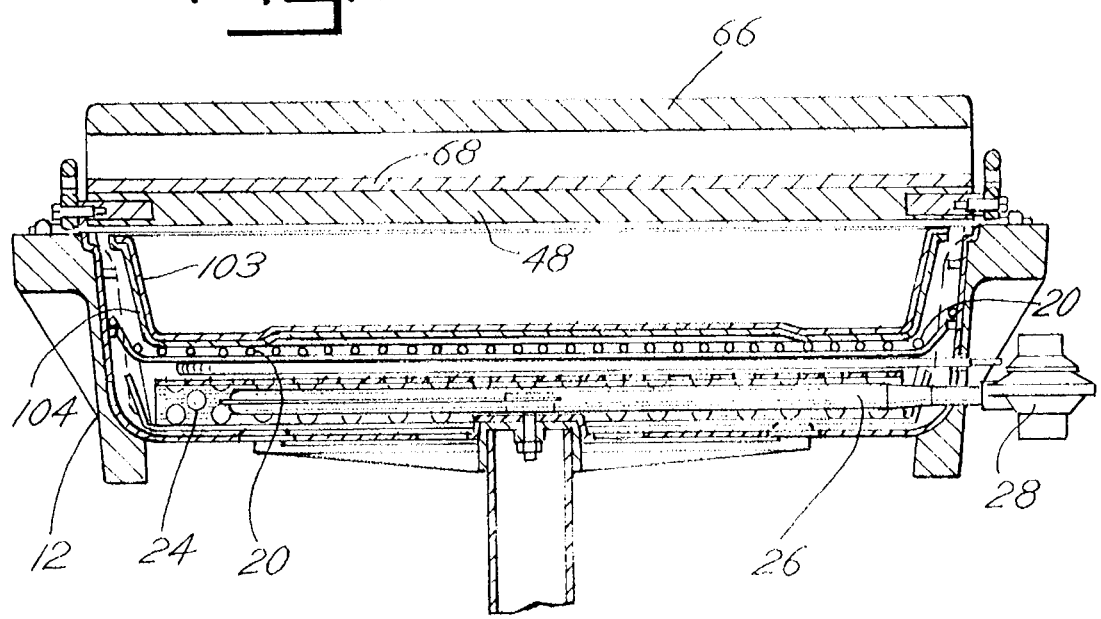

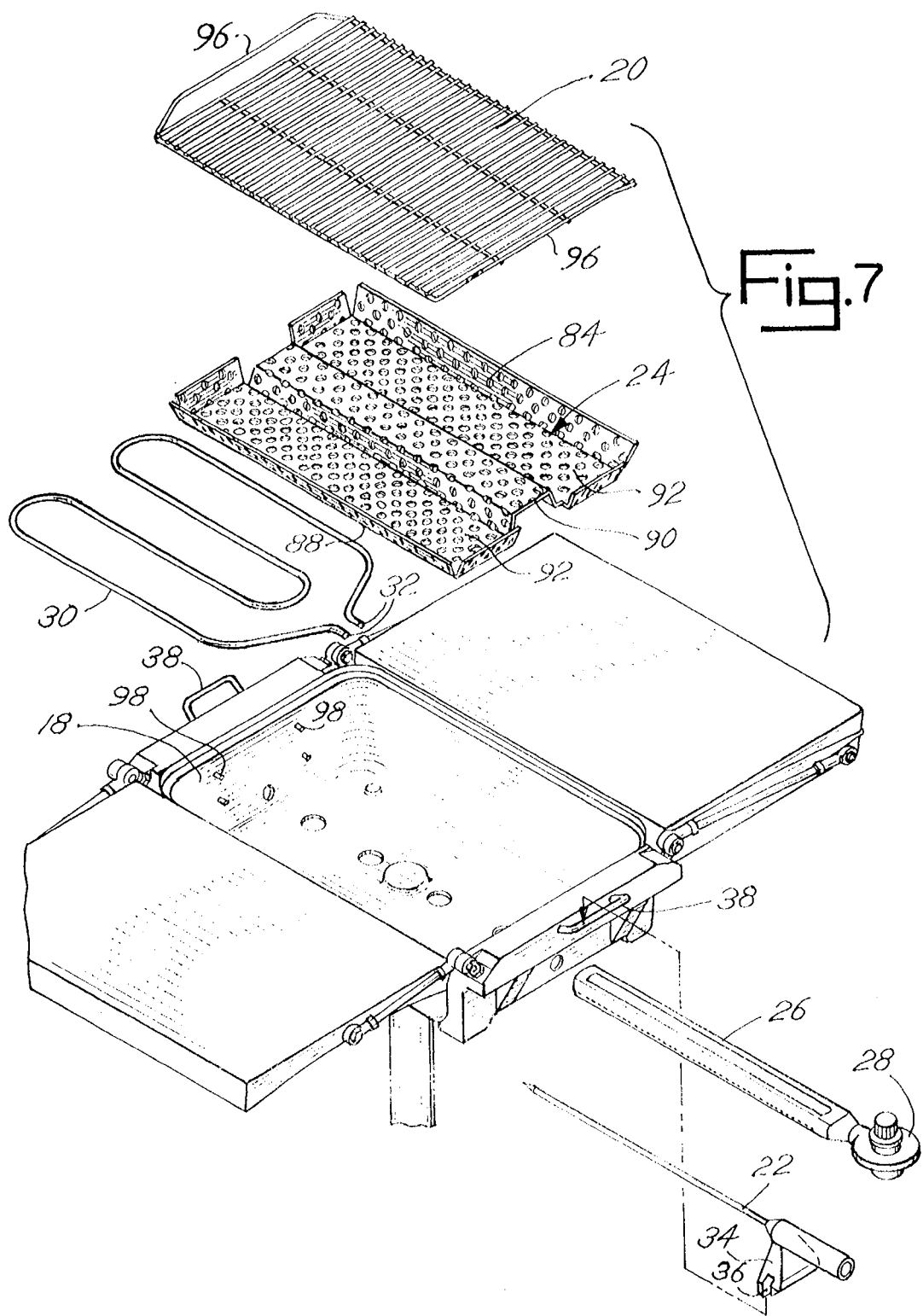

5,524,610

SOLAR POWERED/MULTIPLE FUEL COOKING DEVICE

This invention relates to a cooking device which uses any of several fuels, including solar radiation, to effect cooking.

Outdoor cooking has become increasingly popular in recent years. Many different kinds of outdoor grills are readily available. Most of the grills currently available use charcoal or gas as a fuel. Because of safety and environmental considerations, electric grills are becoming increasingly popular. Because of its availability at no cost, and also because of environmental considerations, solar radiation is a desirable cooking fuel. However, most existing solar grills use compound three-dimensional parabolic reflectors to focus solar radiation at a fixed point. This requires continual re-aiming of the device to match the travel of the sun. Furthermore, such parabolic cooking devices often generate heat that is too hot for efficient cooking, and are not readily adaptable for use with other fuels when solar radiation is not available.

The present invention relates to a device that uses solar radiation to effect cooking. The device includes a base which includes a support for holding food to be cooked, and linear two-dimensional parabolic reflectors on opposite sides of the base. The linear parabolic reflectors concentrate solar radiation along a line or axis extending along the length of the base. Accordingly, efficient utilization of solar radiation is possible, and the device collects solar radiation efficiently for several hours without re-aiming, since the reflectors have a substantially constant curve along the length of the reflector and thus concentrate solar radiation along the aforementioned line or axis instead of at a point. Furthermore, the base is provided with a gas burner and an electric heating element, as well as a grate which holds charcoal, wood, paper, dung, cooking candles, or any other available fuel. Accordingly, the present invention may use any readily available fuel when solar radiation is not available.

These and other advantages of the present invention become apparent from the following description, with reference to the accompanying drawings, in which:

FIG. 3 is a fragmentary side elevational view of the cooking device as illustrated in FIG. 1 with the solar reflectors folded into the closed position;

FIG. 4 is a fragmentary side elevational view of the cooking device as illustrated in FIG. 2 with the solar reflectors deployed in their active or operative position;

FIG. 5 is a fragmentary cross-sectional view taken substantially along the lines 5—5 of FIG. 1;

FIG. 6 is a fragmentary cross-sectional view taken substantially along lines 6—6 of FIG. 5;

FIG. 7 is an exploded view in perspective of the cooking device illustrated in FIGS. 1 and 2 with the solar reflectors folded into an inactive open position;

Figure 1:
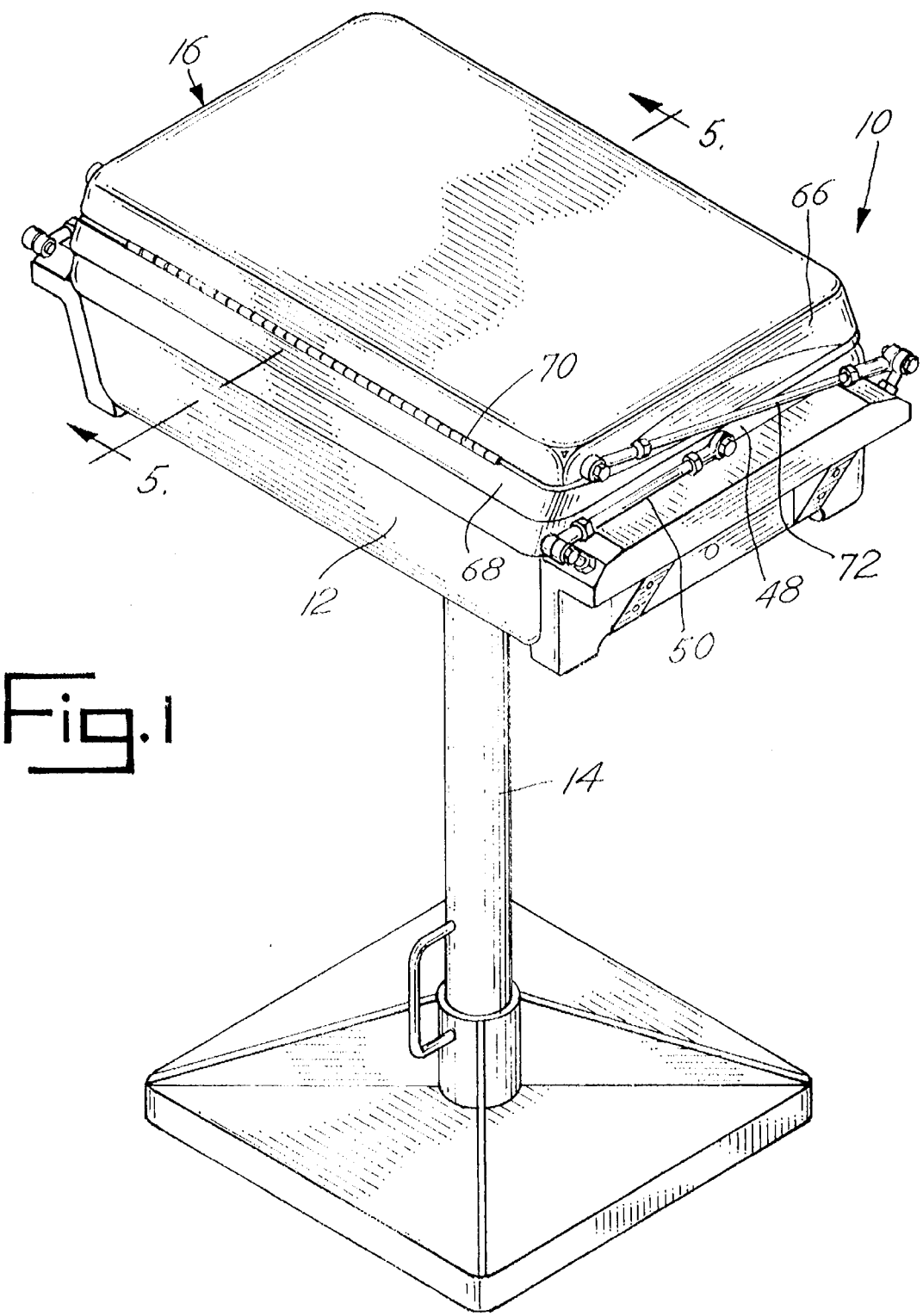
FIG. 1 is a view in perspective of a cooking device made pursuant to the present invention illustrated with the solar reflectors folded into a closed position.
Figure 2:
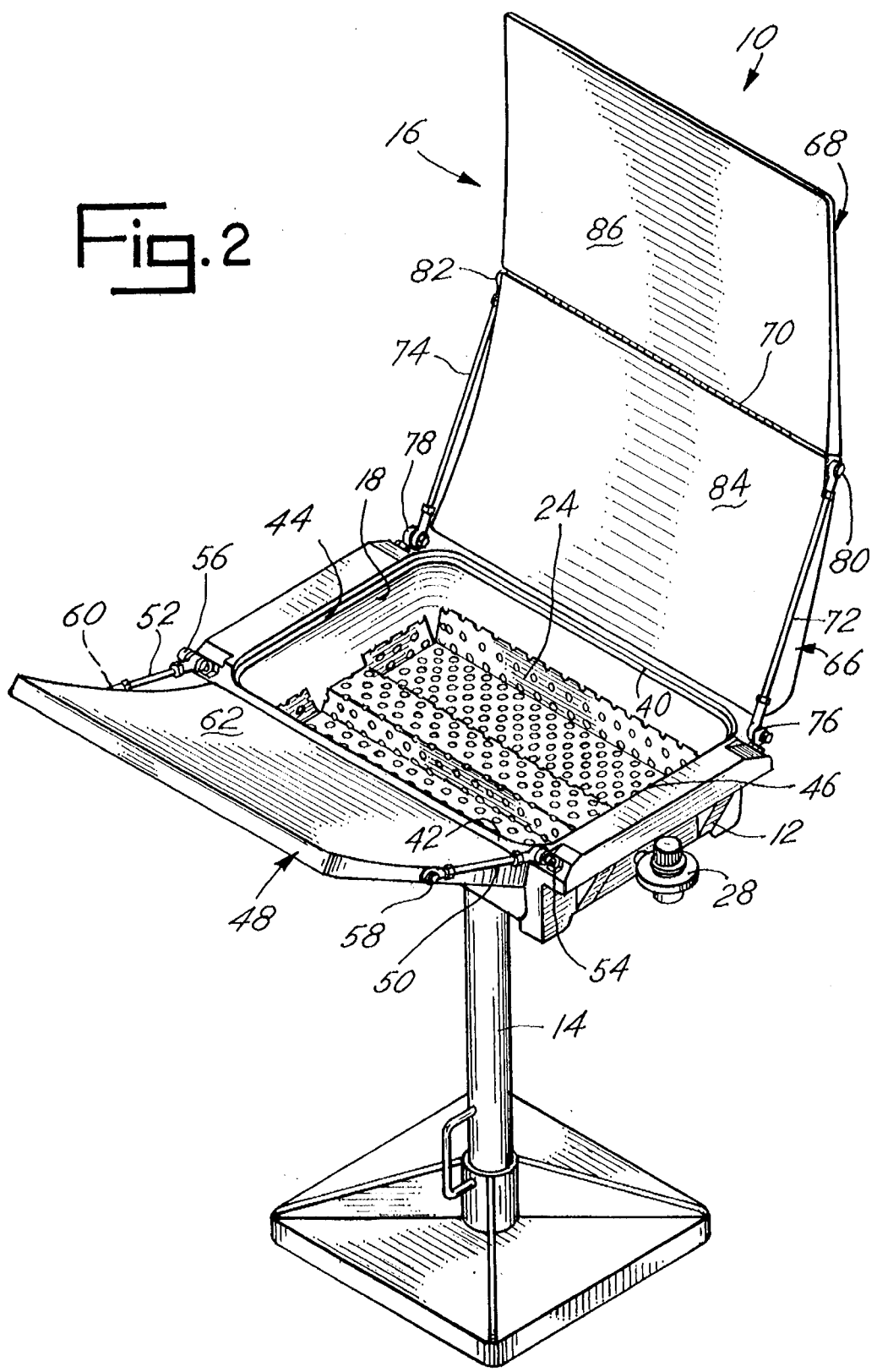
FIG. 2 is a view similar to FIG. 1, but illustrating the solar reflectors used to effect cooking deployed in their active or operative position.
Figure 8:
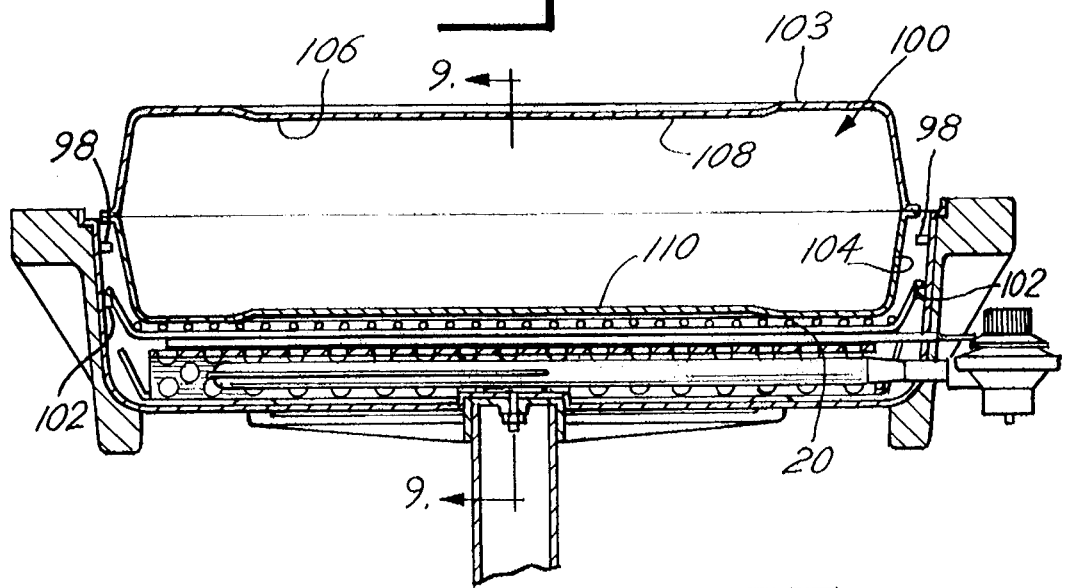
FIG. 8 is a view similar to FIG. 6 but illustrating a cooking container mounted within the cooker illustrated in FIGS. 1–7.
Figure 9:
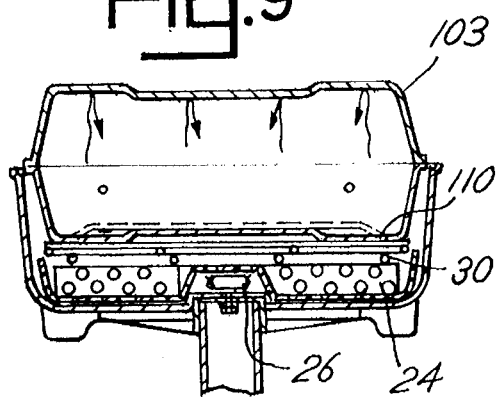
FIG. 9 is a fragmentary cross-sectional view taken substantially along lines 9—9 of FIG. 8 but illustrating the cooking container deployed in a manner in which cooking is effected by a fuel other than solar radiation.

Referring now to the drawings, a cooking device made according to the present invention is illustrated generally by the numeral 10 and includes a base 12 supported on a conventional pedestal 14. A set of solar reflectors 16 is illustrated in FIG. 1 folded into a closed position covering the base 12 as will hereinafter be described. As best illustrated in FIG. 2, when the solar reflectors 16 are deployed in the open position, an opening 18 is defined in the base 12 in which a food support, such as a grill 20 or spit 22 (FIG. 7) supports food in the opening 18 for cooking. As will be hereinafter explained, a perforated sheet metal grate 24 is installed in the opening 18 to support charcoal, wood, paper, dung, cooking candles, etc. when such are used to effect cooking. As illustrated in FIGS. 5–6, a gas burner 26 and a regulator 28 is mounted below grate 24, and an electric heating unit 30 is installed between the grate 24 and the grill 20. The electric heating unit 30 includes terminal ends 32 which extend through corresponding apertures in the base 12 for connection to a source for electrical energy. The electric heating unit 30 is normally removed when the grate is used for holding charcoal or other combustibles to effect cooking. The spit 22 includes a mounting bracket 34 including slots 36 which are received on one of the handles 38 extending from the base 12 to thereby mount the spit 22 just above the top of the base 12.

The base 12 includes longitudinally extending side edges 40, 42, and end edges 44, 46. Reflectors 16 include a reflector panel 48 which extends along edge 42 of the base 12. The reflector panel 48 is mounted on the base 12 by a pair of arms 50, 52. The arms 50, 52 are secured to the base 12 by a frictional pivots 54, 56 and to the panel 48 by friction pivots 58, 60. Accordingly, the reflector panel 48 is free to pivot relative to the base 12 about either of the pivots 58, 60 or the pivots 54, 56. Reflector panel 48 carries a linear two-dimensional parabolic reflective surface 62, which is effective to reflect solar radiation, as will hereinafter be described. The side of panel 48 opposite surface 62 is a durable surface. The curve of the parabolic reflective surface 62 is substantially constant along the length thereof, so that solar radiation will be reflected, as will hereinafter be described, into a linear beam extending along an axis X which extends along the length of the base 12 substantially parallel to the edges 40 and 42.

A pair of linear two-dimensional parabolic reflective panels 66, 68 extend along the edge 40 of the base 12. The lower edge of the panel 68 is connected to the upper edge of the panel 66 by a elongated frictional hinge 70, so that the panels 66, 68 may be adjusted to one another and thereafter remain in position. The panels 66, 68 are mounted on the base 12 by arms 72, 74 which are connected to the base 12 by conventional friction pivots 76, 78. The opposite ends of the arms 72, 74 are connected at a point near the upper edge of panel 66 by frictional pivots 80, 82. The panel 66 includes a curved, polished, active reflecting surface 84, and the panel 68 includes a curved, polished, active reflective surface 86. The curve of the surfaces 84, 86 is substantially constant along the length of the panels so that solar radiation is reflected as will hereinafter be described along the axis X. The side of the panels 66, 68 opposite the active reflective surfaces 84, 86 are a durable surface as will hereinafter be described.

When the cooking device 10 is used to cook using solar radiation, the reflectors 16 are unfolded from the position illustrated in FIGS. 1 and 3 into the position illustrated in FIG. 2. Accordingly, the arms 72, 74 are pivoted about the pivots 76, 78, and the panel 68 is folded away from the panel 66 about the hinge 70. The panel 48 is then folded away from the opening 18 by pivoting arms 50, 52 about the frictional pivots 54, 56. The cooker 10 is then oriented so that reflective surfaces 84, 86 face the sun. The angle of the panel 48 is then adjusted, by pivoting about the pivots 54, 56 and 58, 60 such that the sun is reflected at an oblique angle toward the opening 18 as illustrated in FIG. 4. The angles of the panels 66, 68 are then adjusted by pivoting about the pivots 76, 78 and 80, 82, and by pivoting the panels 66, 68 relative to each other about the hinge 70, so that solar radiation again is illustrated in FIG. 4, is reflected off of the panels 66, 68 toward a common axis X. The angle of the panel 48 is adjusted such that solar radiation reflected by this panel is also reflected toward the axis X. Accordingly, the solar radiation is focused into a linear beam extending along the axis X. The location of the axis X may be adjusted up and down, and to left and right relative to the base 12, by adjusting the relative angles of the panels 48, 66, and 68. Once positioned, because of the frictional pivots, the panels remain in position until moved. Preferably, the panels are adjusted so that the axis X coincides with the spit 22 if the spit is used to support the food to be cooked. The concentration of solar radiation into the linear beam along the axis X is visible and may be felt by the users hand. If the grill 20 is used to support food to be cooked, the relative angles of the panels are adjusted so that the axis X is lowered onto the grill 20. The fact that the transverse cross section of the panels 48, 66 and 68 are substantially constant along their length causes the intensity of the solar radiation to be spread along the axis X to also be substantially constant between the ends 44, 46 of the base 12. Accordingly, food can be cooked in a uniform manner. Although the concentration of solar radiation is highest along the axis X, the intensity of the radiation falls off as a function of the distance from the axis X so that food placed on the grill 20 away from the axis X will also be cooked.

Food may also be cooked by placing fuel, such as charcoal, wood, paper or dung, on the grate 24. Fuel can then be ignited to broil food on the spit 22 or on the grill 20 in the normal manner. The grate 24 includes upwardly extending side portions 88 to retain the fuel on the grate 24. The grate 24 further has a contoured center portion 90. The contoured center portion 90 fits over the burner 26 so that the burner need not be removed from base when the grate is used. Side panels 92 defined between the contoured portion 90 and the edge portions 88 form a tray in which, for example, cooking candles may be placed to effect cooking in this way. The gas burner 26 can be connected to a propane source and used to heat lava briquettes placed on the grate 24 in the same manner that existing gas grills are used. The electric burner 30 is preferably removed when either the gas burner or other fuel is used on the grate 24. The heating element 30 can quickly be reinstalled, and connected to a source of electrical energy.

The grate 20, as illustrated in FIG. 7, is provided with edge portion 96. When the cooking device 10 is used to cook food using the grill 20 using either the solar reflector, the heating elements 30 or 26, or fuel on the grate 24, the grate 20 is placed in the base 12 with the end portions 96 resting on the upper set of pegs 98, and if a fuel other than solar radiation is used, the reflectors 16 are folded as illustrated in FIG. 7 to provide tables on opposite sides of the base 12.

This is done by folding the panel 68 about the hinge 70 such that the surface 86 faces the surface 84, and then pivoting the panel 66, 68 about the pivots 76, 78 into the horizontal position illustrated in FIG. 7. The panel 48 is then rotated about the pivots 58, 60 such that the side of the panel opposite the active side 62 faces upwardly, and then rotating the arms 50, 52 about the pivots 54, 56 so that the panel 48 is rotated into the horizontal position.

Referring now to FIGS. 5–6 and 8–11, food may also be cooked using a container generally indicated by numeral 100. The container 100 is supported within the base 12 by inverting the grate 20, allowing side portions 96 to rest on the lower set of pegs or supports 102. Accordingly, the container 100 projects out of the opening 18 and intersects the axis X. The container 100 is comprised of two complimentary dished members 103, 104. The dished member 102 in its orientation illustrating FIG. 8 acts as a lid covering the dished member 104. The inner surface 106 of the dished member 102 is coated with a heat reflecting substance Titanium Nitride or equivalent reflective surface. Each of the members 103, 104 are provided with a depressed portion 108, 110.

Figure 10:
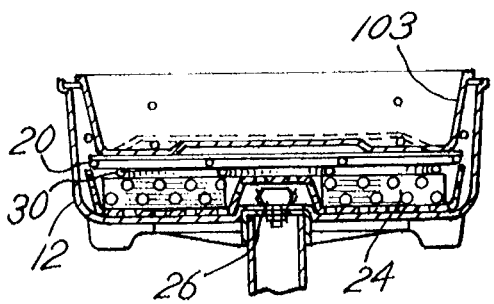
FIG. 10 is a view similar to FIG. 9 but illustrating the cooker and food container with the upper lid removed.
Figure 11:
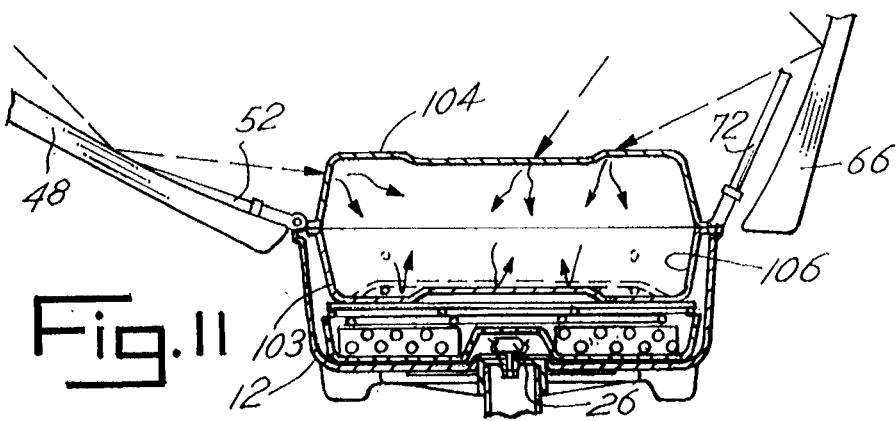
FIG. 11 is a view similar to FIG. 9, but illustrating the cooking device with the solar reflectors deployed into the active position and the container deployed in a position for cooking using solar radiation.

Container 100 is illustrated installed in the opening 18 in the orientation used when one of the heat sources other than the solar reflectors are used for cooking. In this case, as most clearly illustrated in FIG. 9, the food within container 100 is heated up through the bottom member 104, and the heat is reflected as indicated by the arrows in FIG. 9 by the reflective substance of 108, thereby enhancing cooking, since heat that would otherwise be transferred through the dish member 103 is instead reflected back to aid cooking. As illustrated in FIG. 10, food can be cooked without using the lid 103. Furthermore, food may be sauted by placing it on the recessed portion 106 while other food is cooked within the container 100. Referring to FIG. 11, the container 100 is set up for solar cooking. As can be seen, solar radiation is reflected by the panels 48, 66 and 68 into the container 100. However, in FIG. 11, the container 100 has been inverted, such that the dished-shaped member 104 is now on top and the dished-shaped member 103 with the reflective surface 106 is on the bottom resting on the grill 20. Accordingly, solar radiation is transmitted through the dished member 104 to cook food within container 100, and heat is reflected back off of the reflecting layer 106 on dished member 103, to thereby assist in cooking.

As most clearly illustrated in FIGS. 5 and 6, all of the components, including the dished members 103, 104, may be installed inside of the base 12 when the device 10 is stored or transported. The dished members 103, 104 are nested within one another and stored on the grill 20, which is placed in its lowered position supported by the pegs or supports 102, 103. The reflectors panel 48 can then be folded over the opening 18, and the reflector panels 68 can be folded against the panel 66. The panels 66, 68 can then be folded over the panel 48, which rests over the opening 18.

I claim:

1. Cooking device comprising a base, food supporting means carried by said base for supporting food to be cooked, and a pair of solar reflectors having curved solar reflecting surface means extending along opposite sides of said food supporting means for focusing solar radiation into a linear beam along said food supporting means, and mounting means for pivotally mounting each of said solar reflectors on said base for pivoting with respect to one another and with respect to said base for focusing solar radiation for heating said food.

2. Cooking device as claimed in claim 1, wherein said support has side edges and end edges, said mounting means including means pivotally mounting each of said solar reflectors on a corresponding one of said edges for pivoting relative to said corresponding edge.

3. Cooking device as claimed in claim 1, wherein said base defines an opening exposing said food supporting means, said solar reflectors extending along said opening and pivoting to focus solar radiation substantially uniformly along an elongated axis extending along said opening substantially parallel to said reflectors.

4. Cooking device as claimed in claim 3, wherein said mounting means mounts each of said reflectors for pivoting from a closed position overlying one another to close said opening to an open position facing each other across said opening, said reflectors being pivotally adjustable in said open position to focus solar radiation along said axis.

5. Cooking device as claimed in claim 4, wherein each of said mounting means includes a pair of arms for each of said reflectors, first pivot means pivotally connecting one end of each of said arms to said base, and second pivot means pivotally connecting to other end of each of said arms to a corresponding reflector.

6. Cooking device as claimed in claim 5, wherein one of said reflectors is divided longitudinally into a pair of segments, and a hinge interconnecting said segments.

7. Cooking device as claimed in claim 5, wherein each of said reflectors has a pair of opposite ends, each of said ends being supported by a corresponding one of the arms secured to said ends.

8. Cooking device as claimed in claim 3, wherein each of said reflectors extend longitudinally along said axis, said solar reflector surface of each of said reflectors having substantially the same parabolic curve at each transverse cross section taken along the length of the reflector.

9. Cooking device as claimed in claim 3, wherein said food supporting means is a container supported within said opening by said base, said axis intersecting said container.

10. Cooking device as claimed in claim 9, wherein said container is divided into a pair of complementary dished members, one of said dished members being supported by said base, the other member being inverted on said one dished member to close the latter, said one dished member having a reflective coating on its inner surface for reflecting heat back into said food.

11. Cooking device as claimed in claim 3, wherein said base supports heat generating means for heating food supported on said food supporting means.

12. Cooking device as claimed in claim 11, wherein said mounting means mounts each of said reflectors for pivoting from a closed position overlying one another to close said opening to an open position facing each other across said opening for focusing solar radiation for heating said food and to an inactive position when the heat generating means is used for heating food.

13. Cooking device as claimed in claim 11, wherein said heat generating means includes a grate supported by said base and a combustible fuel supported on said base.

14. Cooking device as claimed in claim 11, wherein said heat generating means includes a heating element supported by said base.

15. Cooking device as claimed in claim 11, wherein said food supporting means is a container supported within said opening by said base, said axis intersecting said container, said container being divided into a pair of complementary dished members, one of said dished members being supported by said base, the other member being inverted on said one dished member to close the latter, said one dished member having a reflective coating on its inner surface for reflecting heat back into said food when said solar reflectors are used to heat said food, said dished members being inverted when the heat generating means used to heat said food whereby said one dished member closes against the other dished member.

16. Cooking device comprising a base, food supporting means carried by said base for supporting food to be cooked, solar energy reflecting means for focusing solar radiation into a linear beam for heating said food, said solar energy reflecting means being movable from an active position for focusing solar energy into a linear beam for cooking said food to a passive position, and heat generating means carried by said base for cooking food supported on said food supporting means when the solar energy reflecting means is moved to the passive position.

17. Cooking device as claimed in claim 16, wherein said base defines an opening exposing said food supporting means, said solar energy reflecting means being movable between said active position, said passive position, and a closed position closing said opening when the solar cooker is not used.

18. Cooking device as claimed in claim 16, wherein said heat generating means includes a grate supported by said base and a combustible fuel supported on said base.

19. Cooking device as claimed in claim 16, wherein said heat generating means includes an electric heating element supported by said base.

20. Cooking device as claimed in claim 16, wherein said food supporting means is a container supported within said opening by said base, said container being divided into a pair of complementary dished members, one of said dished members being supported by said base, the other member being inverted on said one dished member to close the latter, said one dished member having a reflective coating on its inner surface for reflecting heat back into said food.

21. Cooking device as claimed in claim 16, wherein said base defines an opening said food supporting means, said food supporting means being a container supported within said opening by said base, said axis intersecting said container, said container being divided into a pair of complementary dished members, one of said dished members being supported by said base, the other member being inverted on said one dished member to close the latter, said one dished member having a reflective coating on its inner surface for reflecting heat back into said food when said solar reflectors are used to heat said food, said dished members being inverted when the heat generating means used to heat said food whereby said one dished member closes against the other dished member.

* * * * *